Dec. 17, 1968 R. W. BULLARD 3,417,395

VOLUMETRIC DISPLAY

Filed Aug. 9, 1966

INVENTOR,
Richard W. Bullard

BY: Harry M. Saragovitz, Edward J. Kelly & Herbert Berl

ATTORNEYS.

United States Patent Office 3,417,395

Patented Dec. 17, 1968

3,417,395

VOLUMETRIC DISPLAY

Richard W. Bullard, Las Cruces, N. Mex., assignor to the United States of America as represented by the Secretary of the Army Filed Aug. 9, 1966, Ser. No. 571,685

6 Claims. (Cl. 343—7.9)

ABSTRACT OF THE DISCLOSURE

The disclosure sets forth a procedure for the controlled movement and illumination of linearly and rotatably positionable targets through the cooperative employment therewith of rotatable light beams and mirrors, all programmed to operate in a proper time sequence to effect a synchronized illustration in three dimension.

Figure 1:
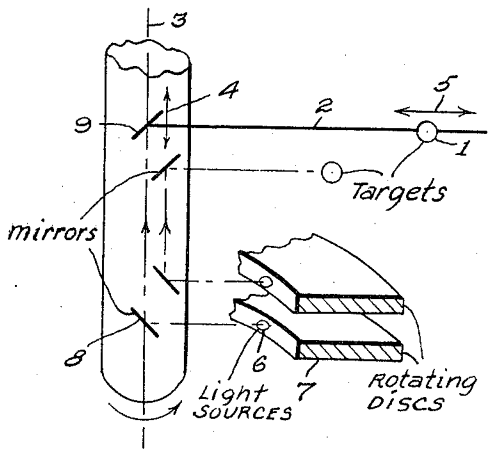

The invention described herein may be manufactured and used by or for the Government, for governmental purposes, without the payment of any royalty thereon.

This invention concerns a volumetric display which will continuously present, in $x$, $y$, and $z$ coordinates, real time position information about any flying object. The real time information data is collected by a separate system, such as radar.

The invention is simple and inexpensive to construct and to operate and is efficient and accurate in performing its function.

Figure 2:
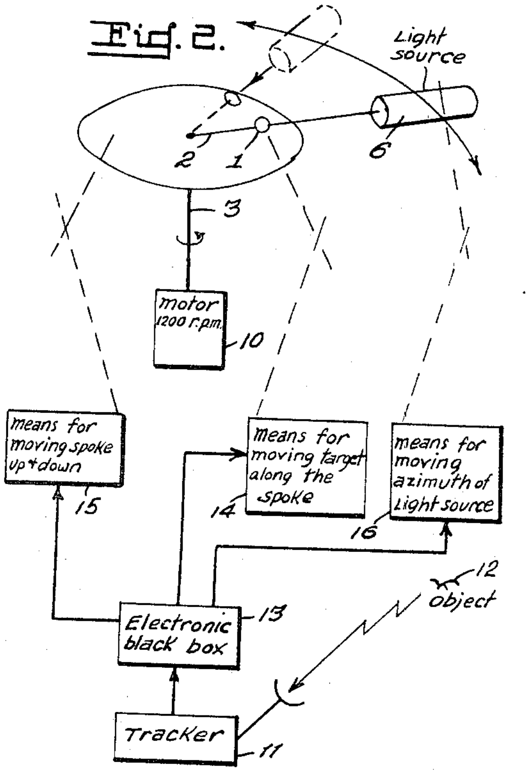
Figure 3:
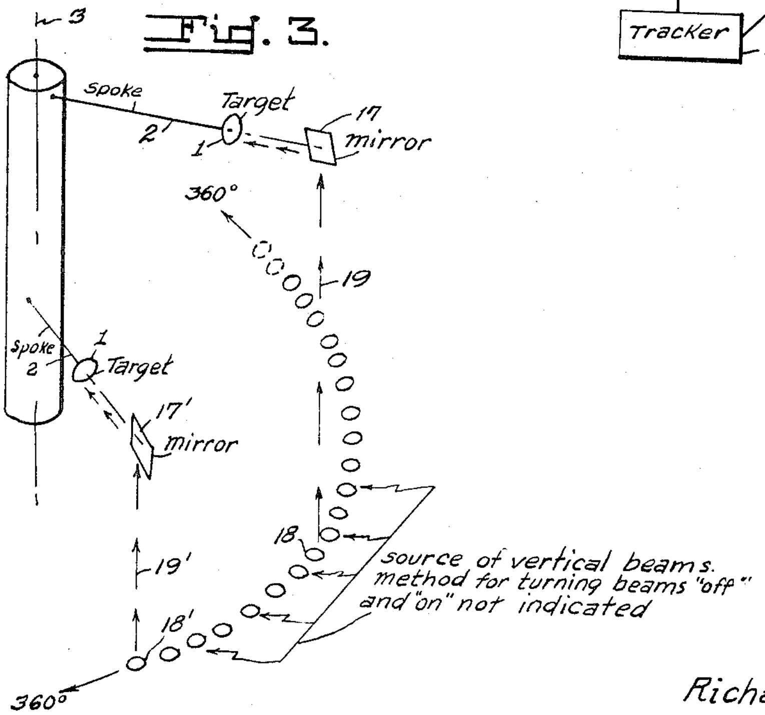

In the drawings:

FIGURE 1 is a diagrammatic view showing the general location and relationship of parts, FIGURE 2 is a schematic diagram of the electro-mechanical setup; and FIGURE 3 is a diagram of a modification of the invention.

In operation, the invention has the appearance of rotating spokes from a rimless bicycle wheel. This resemblance comes from the fact that each target 1 of the display is fastened to a thin wire 2 which in turn is secured to a central hub revolving about axis 3. When the hub is rotated at a constant speed, the targets on their wires are held away from the hub by centrifugal force and the wires appear to be spokes. However, the target spokes are different from ordinary wheel spokes, in that, each target spoke can be independently translated along the axis of the hub as indicated at 4. In addition each target can move along its spoke to be closer to, or farther away from, the central hub as indicated at 5. The spokes may be rigid and self supporting in an extended position if desired, or may be thin and flexible, held to an extended position by centrifugal force during rotation.

It is necessary to illuminate each target when it is positioned at the correct coordinate values of $x$, $y$, and $z$. The beam of light for this illumination comes from lamps 6 in a group of flat disks 7 which are concentric with each other and with the hub. The disks are preferably located adjacent to the base of the hub. Each disk supports a source of light for a single target. The light beam from the disk source strikes a mirror 8 on the rotating hub. The rotating mirror reflects the beam to a second mirror 9, which may be moved along the axis, together with wire 2, as indicated at 4. Mirror 9 reflects the beam to target 1, say 20 times a second with the hub and targets rotating at, say 1200 r.p.m. By this mirror system each light beam coming from its disk can be deflected along the hub by mirror 8 and outwardly to its target by mirror 9. The configuration of the light sources in the flat disks, when combined with the locations of the deflecting mirrors on the hub, permit all targets to be displayed simultaneously without mutual interference, if desired. In fact, targets can appear to pass through one another. Targets can be identified by a number visually attached to them and by color.

FIGURE 2 diagrammatically illustrates a propelling system for moving the spokes up and down and for moving the targets to longer and shorter radii along the spokes. A stroboscopic effect gives the appearance of a stationary target at any value of $x$ and $y$ coordinates. To add the third dimension of "Z," it is necessary to move the plane up or down by moving the revolving spoke up or down. Motor 10 rotates the shaft with its attached spoke at a constant speed of, say 1200 r.p.m.

A tracking device 11 tracks an object such as an aircraft, missile, submarine, or such illustrated at 12 and the positional information is fed to the electronic black box 13. This black box converts the positional information to three movement controllers. First, the proper radius is set by controller mechanism 14. Second, the height (or Z dimension) is set by controller mechanism 15 and, third, the azimuth angle of the light source is set by controller mechanism 16. These three mechanisms are capable of positioning and illuminating the target 1 at any position. By changing them at a constant rate, the target will move at a constant rate. The data to be displayed by the present invention must be collected by a separate system. The format of the collected data is unimportant because interface electronic equipment will convert any data to the requirements of the display. The data is in proper form and is properly scaled to meet the requirements of the display.

The raw tracking data may come from a radar, a sonar, three telescopes, a doppler system, or a computer. The source of the raw tracking data is not important.

The targets 1 are very small reflectors which diffuse any light that strikes them. One target is strung on each wire spoke 2 and each one can be controlled to slide in close to the hub or to move out to the end of the spoke. The spokes can be controlled to move up and down. These are the only two variable motions on the revolving part of the display. The only other controlled movement is on the stationary base of the display. On the base it is necessary to control the azimuth angle from which a beam of light emanates to strike the target.

A spoke revolving at 1200 r.p.m. forms a single plane. This revolving spoke will appear as a blur. If a flashing stroboscope is focused on the revolving spoke, the whole spoke will appear to stand still. If the light from the stroboscope is focused only on the target, then only the target will appear to stand still. With proper use of the stroboscope light, the target can be made to appear stationary at any point in its circular path. Since the circular path can be made large or small, an infinite number of $x$, $y$ coordinate combinations can be generated in a single "$xy$" plane. Also, the target could be illuminated more than one time per revolution, if desired, to represent two or more objects in the same $x$, $y$ plane.

The flat disks which contain the light sources require a small torque for positioning them to the proper azimuth. The hub will receive a constant torque which will keep it revolving at a steady angular velocity. For simplicity, the mechanics of the driving system are not described.

In FIGURE 3 the mirrors 17, 17′ are located at the end of the spoke over a circumference of vertical lights 18, 18′. Light sources 18 direct beams 19, 19′ to mirrors 17, 17′ and thence to targets 1. The lights 18, 18′ are selectively illuminated at the proper time to yield the stroboscopic effect desired as in FIGURE 1. Mirrors 17, 17′, targets 1 and spokes 2 are translated up and down the axis of the rotating hub as explained relative to FIGURE 1.

For clarity, only two targets are shown on any one diagram. However, in practice, the display may have 100 spokes, each with a target and mirror system. Each spoke would be spaced 3.6° of the hub circumference.

What is claimed is:

1. The method of displaying in three-dimension, information about the position of an object comprising: rotating a light reflecting target representing the object about an axis in a plane; varying the distance from the axis of rotation to the target; translating the plane of rotation along the axis; and illuminating the target periodically from a remote source of light.

2. The method of claim 1 wherein the target is illuminated substantially in synchronism with the period of rotation about the axis.

3. The method of claim 1 wherein the target is illuminated more than once per revolution to represent more than one object in the same plane of rotation.

4. Apparatus for displaying, in three-dimension, information about the position of an object comprising: means for rotating a light reflecting target reperesenting the object about an axis in an $x$, $y$ plane, means for translating the object along the axis in the $z$ plane, and lighting means at a remote point projecting a beam of light to said target for illuminating the target at a location in its path of movement representing a position of the object.

5. Apparatus as in claim 4 wherein said lighting means comprises a lamp rotated about the axis, and reflecting means adjacent to said axis to reflect light from said lamp to said target.

6. Apparatus as in claim 4 wherein said lighting means comprises a series of lamps located outwardly from the axis, and means to direct light from said lamps to said target.

References Cited

UNITED STATES PATENTS 3,212,084 10/1965 Garrison ------------ 343—7.9
3,323,126 5/1967 Malone et al. ------ 343—7.9 X RODNEY D. BENNETT, *Primary Examiner.*

D. C. KAUFMAN, *Assistant Examiner.*